United States Patent Office 3,086,853
Patented Apr. 23, 1963

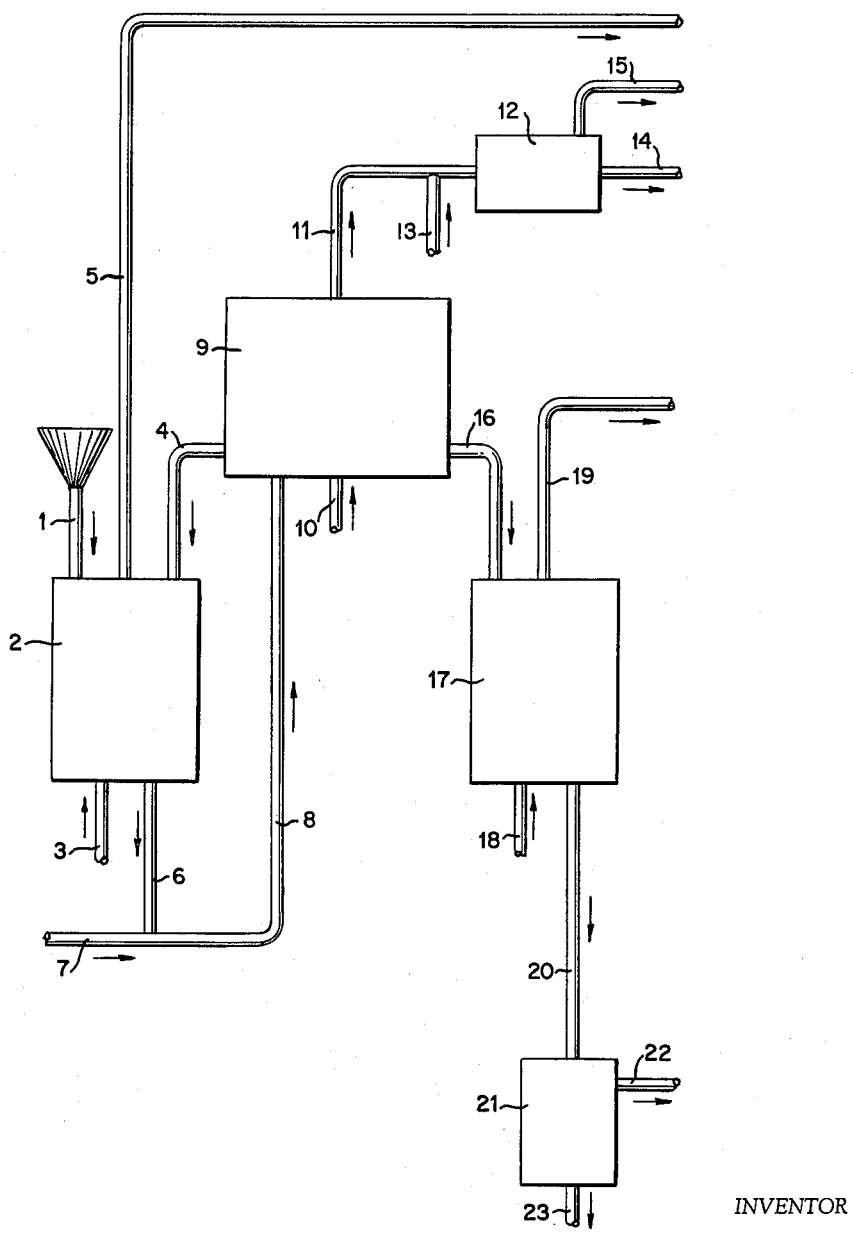

3,086,853
METHOD OF GASIFYING COMBUSTIBLE
MATERIAL IN A FLUIDIZED BED
Åke Rudolf Lennart Brandberg, Örebro, Sweden, assignor
to Svenska Skifferolje Aktiebolaget, a company of
Sweden
Filed Apr. 13, 1960, Ser. No. 22,010
Claims priority, application Sweden Apr. 17, 1959
5 Claims. (Cl. 48—197)

The present invention relates to a method of gasifying combustible material. The method according to the invention may be applied in the gasification of various kinds of combustible materials, but it is especially advantageous in the gasification of such combustible materials as contain large quantities of ash constituents. Such a material is bituminous shale and coke of such shale, and the following description will be completely related to the gasification of shale and shale coke, whereas this fact should not be considered as implying any limitation as to the usefulness of the method.

The gasification of shale or shale coke means that part of the organic material is converted to gas phase by reaction with $H_2O$ or $CO_2$, both reactions being endothermic. The heat requirement is satisfied by oxygen being simultaneously supplied (in the form of air or oxygen of high percentage) which reacts exothermically with the organic material. Said last mentioned reaction is considerably faster than the first mentioned one, and a narrow oxidation zone is therefore formed at the bottom of the reactor, where all oxygen but only a small part of the $CO_2$ and $H_2O$ is consumed, and a reduction zone is formed above said oxidation zone.

The production of heat becomes intensive in the oxidation zone especially in a fine-grained material, and therefore the heat emission must be so good that operation in a fluidized bed is the only practicable method. In spite of an efficient heat emission the risk of the grains being agglomerated in the narrow oxidation zone is impending for easily sintered shale ashes, and certain conditions must be maintained in order that this risk of agglomeration be eliminated. The heat emission, substantially taking place by the movements of the grains in the bed, is dependent on the velocity of the grains and this velocity is increased by increased gas velocity and decreased by increased grain size. The production of heat per unit of volume is dependent on the oxygen content in the gasifying agents and the percentage of carbon in the grains. To illustrate the connection between these factors it may be mentioned that tests have shown that grains having a size above 1.25 millimeters cannot be used with $O_2$—$N_2$ mixtures containing 18% $O_2$ at a gas velocity of 0.45 meter per second.

If the gas velocity is reduced to 0.3 meter per second the percentage of $O_2$ must be reduced to about 13%, but a higher percentage of oxygen than 21% cannot be used even at a gas velocity of 0.6 meter per second. On the other hand, this was possible when using $O_2$—$H_2O$ mixtures as a gasifying agent. When using such mixtures, the gas having a velocity of 0.45 m./sec., it was possible to use an oxygen content of up to 28%.

As stated, the gasifying reactions between carbon and steam or $CO_2$, is much slower than the carbon-oxygen reaction, and a considerable time of contact between gas and bed is required to obtain a satisfying conversion of the gas. In other words, the bed must have a considerable height which is especially true if the ashes sinter easily, make it necessary to operate at comparatively low gasifying temperatures, for instance 900–950° C. The difference in this respect from shales having higher sintering temperatures is not great, however, inasmuch as the reactions are comparatively slightly dependent on temperature on this level of temperature, that is, they are controlled by diffusion. Generally it may be said that in gasifying a Swedish oil shale in accordance with the invention, the temperature should be limited upwards to 950–1000° C. on account of the risk of sintering.

The fact that a large quantity of heat is required to bring the combustible material up to reaction temperature makes it necessary to consume a comparatively large quantity of oxygen to bring the temperature up to the desired level, especially as an ideal counter current could not very well be arranged in fluidized beds. This is especially true for shale with its high content of inert ash material. If the shale is gasified with pure oxygen and steam, for the production of water gas, the content of $CO_2$ in the water gas will be high, and the consumption of pure oxygen will be high, which is of course a serious disadvantage to the process. According to the invention this inconvenience may be overcome by the gasification being divided into two stages, in the first of which, wherein the main portion of the heat requirement is covered, the oxygen is supplied in the form of air and in the second in the form of substantially pure oxygen. Hereby the consumption of pure oxygen is strongly reduced, as the carbonaceous residue from the first stage is supplied to the second stage while having almost full reaction temperature, and only the heat requirement of the gasifying agent and of the endothermic reactions $CO_2+C$ and $H_2O+C$ has to be covered. The first gasifying stage, operating with an excess of carbon and hydrogen in relation to the air supplied, shall of course proceed with the ratio $CO_2$ to $CO$ being as high as possible, in order that as little carbon as possible shall be consumed and that the quantity of gas passing through the reactor shall be as small as possible. Thus the losses of CO become small. This is possible to attain by operating at such a low temperature, less than 800° C., that the speeds of the gasifying reactions are low, or by operating at higher temperatures with a low height of bed. This latter alternative is not always possible for practical reasons.

The invention will be described in the following with reference to the accompanying drawing, which shows diagrammatically how the method according to the invention may be combined with a pyrolysis of bituminous shale.

Shale, suitably having a grain size below 1.5 millimeter is supplied through a conduit 1 to a pyrolysis reactor 2 wherein the shale is pyrolyzed in a fluidized state. The shale is kept in the fluidized state partly by the gases and oil vapors developed at the pyrolysis, partly by steam supplied through a conduit 3. The temperature in the fluidized bed is suitably maintained at 500–600° C. The heat requirement of the pyrolysis is covered by hot shale coke from the first gasifying stage being supplied through the conduit 4, as will be described below. The pyrolysis gases formed are withdrawn through a conduit 5.

The pyrolysis residue is discharged through a conduit 6 and is conveyed together with a carrier gas supplied through a conduit 7, e.g. air, flue gas or gas from the first gasifying stage, through a conduit 8 to a gasifying reactor 9 in which the first gasifying stage takes place in a fluidized bed. The heat requirement is covered by a partial combustion of the combustible material in the pyrolysis residue by means of air supplied through a conduit 10. The temperature in the fluidized bed is suitably maintained at 850–950° C. The gas formed, which contains some carbon monoxide, is withdrawn through a conduit 11 and is conducted to a waste gas boiler 12 wherein its physical heat is utilized. Secondary air is supplied through a conduit 13 for combustion of the CO-content. The flue gas escapes through the outlet 14 and steam leaves through a conduit 15.

A part of the solid, glowing gasifying residue is conveyed through the conduit 4 to the pyrolysis reactor 2 for covering the heat requirement of the pyrolysis as previously described. The rest is conducted through a conduit 16 to a gasifying reactor 17 wherein the second stage of the gasifying operation is performed in a fluidized bed. Serving as gasifying agent here is a mixture of oxygen, or air strongly enriched in oxygen, and steam supplied through a conduit 18. The temperature in the fluidized bed is suitably maintained at 900–1000° C. The water gas formed is withdrawn through the conduit 19.

The hot shale ashes formed in this second gasifying stage are discharged through a conduit 20 and are cooled in a cooling device 21 which may be arranged, if desired, as a steam generator, the steam being withdrawn through a conduit 22. The cooled ashes are withdrawn at 23.

Sulphuric materials, for instance shales, often give rise to problems in gasifying as they generate gases containing sulphur dioxide. In such materials sulphur largely occur as pyrite, especially in shales having a high percentage of sulphur, but it also occurs as organic sulphur and as sulphate. For instance, a shale that was investigated and had a total percentage of sulphur of 6–6.5% contained 85% of the sulphur as pyritic sulphur.

In the combustion of shale or shale coke (wherein the original pyritic sulphur now occurs as iron sulphide) most of the sulphur is released and it has hitherto not been possible to recombine it completely with metal compounds forming thermally stable sulphates at the temperature in question, e.g. as $CaSO_4$ by addition of limestone.

In gasifying the conditions are different. The iron sulphide is thermally stable within the actual temperature ranges and does only react to a small extent with $CO_2$ or $H_2O$ in a reducing atmosphere, that is, when the gasification of carbon takes place simultaneously. A study of the conditions of equilibrium in the systems Fe—S—H—O or Fe—S—C—O may give a hint which indicates said fact. The partial pressure of $H_2S$ and COS is low as soon as the percentages of $H_2$ and CO, respectively, have reached considerable values (corresponding to a ratio of $H_2O$ to $H_2$ and of $CO_2$ to CO of 10–20), and the partial pressure of $SO_2$ is then exceedingly low. For this reason $SO_2$ formed in the oxidation zone of the gasifying reactor will be reduced and recombined in the reduction zone. The conditions of equilibrium are similar in corresponding systems where Ca is a component instead of Fe.

Investigations have also shown, on the one hand, that low contents of sulphur compounds, a few tenths of a percent, are obtained in the gas formed already when the atmosphere in the fluidized bed is moderately reducing and, on the other hand, that the percentages of COS and $H_2S$, respectively, increase while the percentage of $SO_2$ decreases the more strongly reducing the atmosphere is. The sulphur content of the gas decreases with a decreasing ratio of $CO_2$ to CO and $H_2O$ to $H_2$, respectively, and with an increasing content of carbon in the bed. In gasifying with air, the ratio $CO_2$ to CO should not exceed 15 if any considerable effect is to be expected and should preferably not exceed 8 if low percentages of sulphur compounds are to be obtained in the gas.

In the gasification of sulphuric material, especially shale, released pyritic sulphur and organic sulphur may largely be combined by an extra addition of such substances as bind the sulphur chemically, such as iron oxide or limestone. The addition is moderate, however, compared to what is needed in combustion, for only a part of the sulphur in the material need be bound in this way. Swedish shale usually contains some limestone and this will serve as a sulphur binder in the gasification process. If, in spite of this, the sulphur content in the outgoing gas should be too high, extra sulphur binders may be added, as stated above, either in the pyrolysis stage or in one or both gasifying stages.

In the method according to the invention, the ashes leaving the second gasifying stage will contain, under said conditions, a high percentage of sulphur, approximately equal to the percentage of sulphur in the pyrolysis residue supplied to the first gasifying stage, while the percentage of carbon in the ashes simultaneously has been reduced to 1 or 2%. From these ashes the sulphur may be recovered, provided considerable quantities are concerned, in a much more favourable way than would be possible by a parallel combustion of carbon and sulphur. The hot ashes from e.g. the second gasifying stage may be directly burnt with air, and by using, for instance, a shale giving ashes containing about 1% and 3–4% S it is possible to produce a gas containing 5–10% $SO_2$. This gas may then be used for manufacturing $H_2SO_4$ or recovering $SO_2$.

If shale is to be used for producing steam or electric power a combination of a gasifying reactor and a conventional steam boiler may be to advantage, as a gas may be produced having such a low content of S that no appreciable problem with flue gases containing $SO_2$ will arise. If the production of steam is to take place with a varying intensity during various periods, for instance, for an extra top production of power during a certain time, it is possible to combine pyrolysis-gasifying reactors and a boiler. The oil is then condensed from the gas and is stored and only the gas is continuously burnt. In this case, however, the pyrolysis gas has to be purified from $H_2S$. As most shales contain after the pyrolysis a certain amount of carbon and hydrogen which cannot be converted to gas phase even by pyrolysis at elevated temperature, a real gasification must be carried out in order to release the carbon from the ashes, so that the residual carbon content in the ashes is kept low, and this must take place under reducing conditions at a relatively high temperature in order to bind the sulphur.

Another advantage in combining a gasifying reactor and a boiler is the fact that the quantity of gas from the gasifying reactor is small compared to the quantity of combustion gas at a direct combustion of shale. The separation of dust from the gas will in this case be more favourable, and no dust need to pass through the boiler, where high gas velocities occur.

What is claimed is:

1. In a method for gasifying a combustible material in a fluidized bed, especially a material having a high ash content, such as bituminous shale, wherein the combustible material is subjected, at a temperature above about 800° C., to controlled oxidation using as oxidizing agent a gas containing free oxygen, the improvement which consists in that the material is gasified in two stages carried out in separate reaction zones, the gasifying agent in the first stage being air, said first stage thus producing a nitrogen-rich gas, the gasifying agent in the second stage being oxygen and steam, said second gasifying stage thus producing a combustible gas which is substantially free from nitrogen and which is withdrawn separately from the gas produced in said first gasifying stage.

2. A method according to claim 1, characterized in that the temperature in the first gasifying stage is maintained at 850–950° C. and in the second gasifying stage at 900–1000° C.

3. A method according to claim 1, characterized in that the addition of air in the first gasifying stage is adjusted in such a way that the volume ratio $CO_2$ to $CO$ in the gas leaving the fluidized bed is 1–15.

4. A method according to claim 3, in which the volume ratio $CO_2$ to $CO$ in the gas leaving the fluidized bed is 2–8.

5. A method according to claim 1, characterized in that combustible constituents of the gas leaving the first gasifying stage are burnt by the addition of secondary air, and the heat content of the gas is utilized in a waste gas boiler.

References Cited in the file of this patent

UNITED STATES PATENTS

| | | |
|---|---|---|
| 2,461,021 | Atwell | Feb. 8, 1949 |
| 2,480,670 | Peck | Aug. 30, 1949 |
| 2,620,348 | May et al. | Dec. 2, 1952 |
| 2,689,787 | Orgorzaly et al. | Sept. 21, 1954 |

FOREIGN PATENTS

| | | |
|---|---|---|
| 649,578 | Great Britain | Jan. 31, 1951 |